Aug. 31, 1954 H. B. CALDWELL ET AL 2,687,857
STEERING MEANS FOR AIRCRAFT LANDING GEAR
Filed June 12, 1950 5 Sheets-Sheet 2
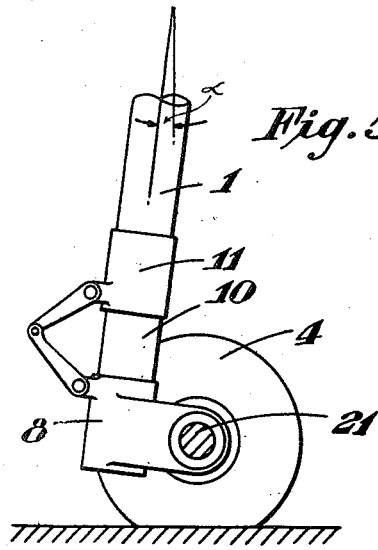
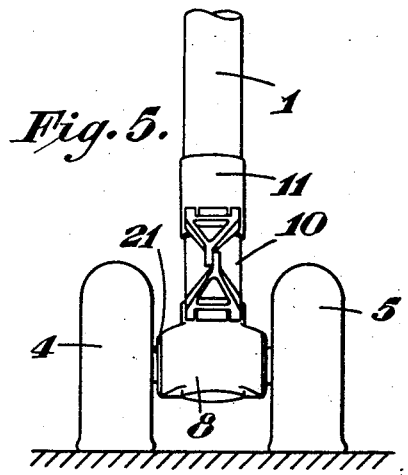
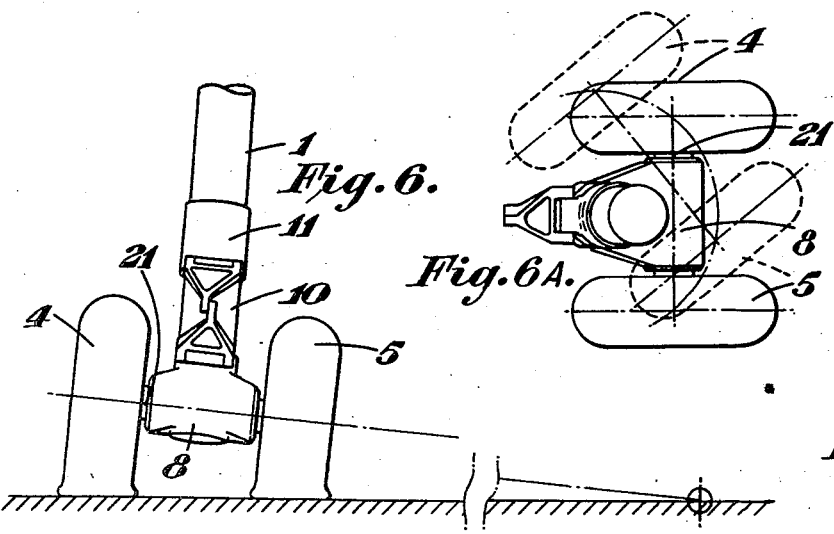
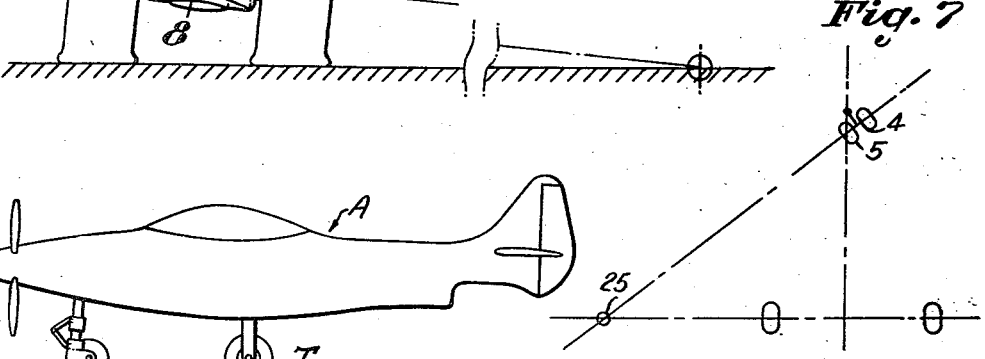
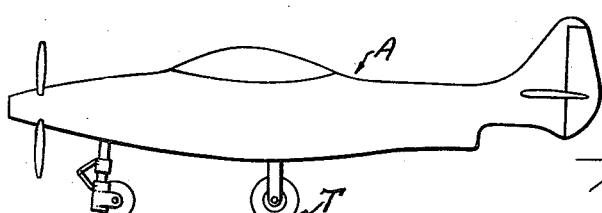
Inventors:
Harry Balshaw Caldwell
+ Kenneth George Hancock;
By their attorneys,
Baldwin, Wight, + Brevost

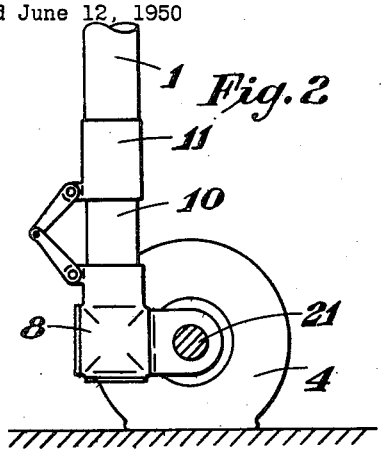
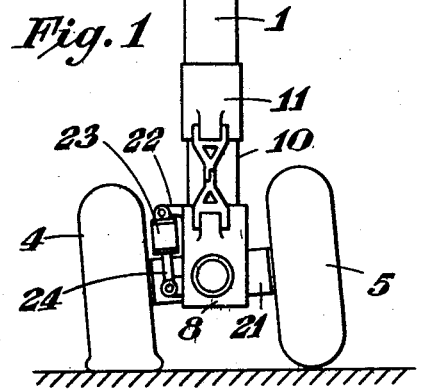
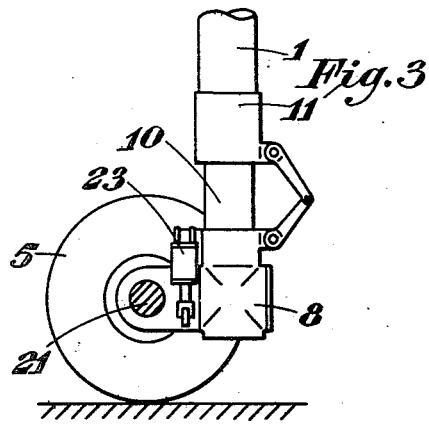
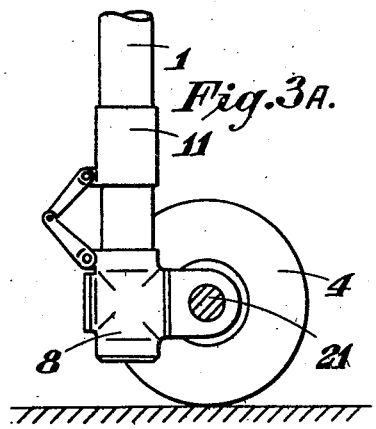
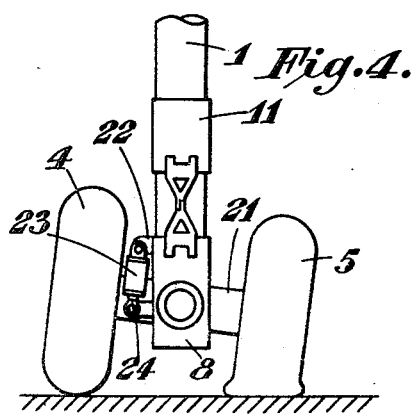
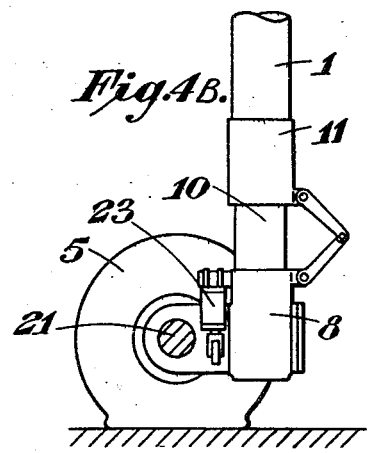

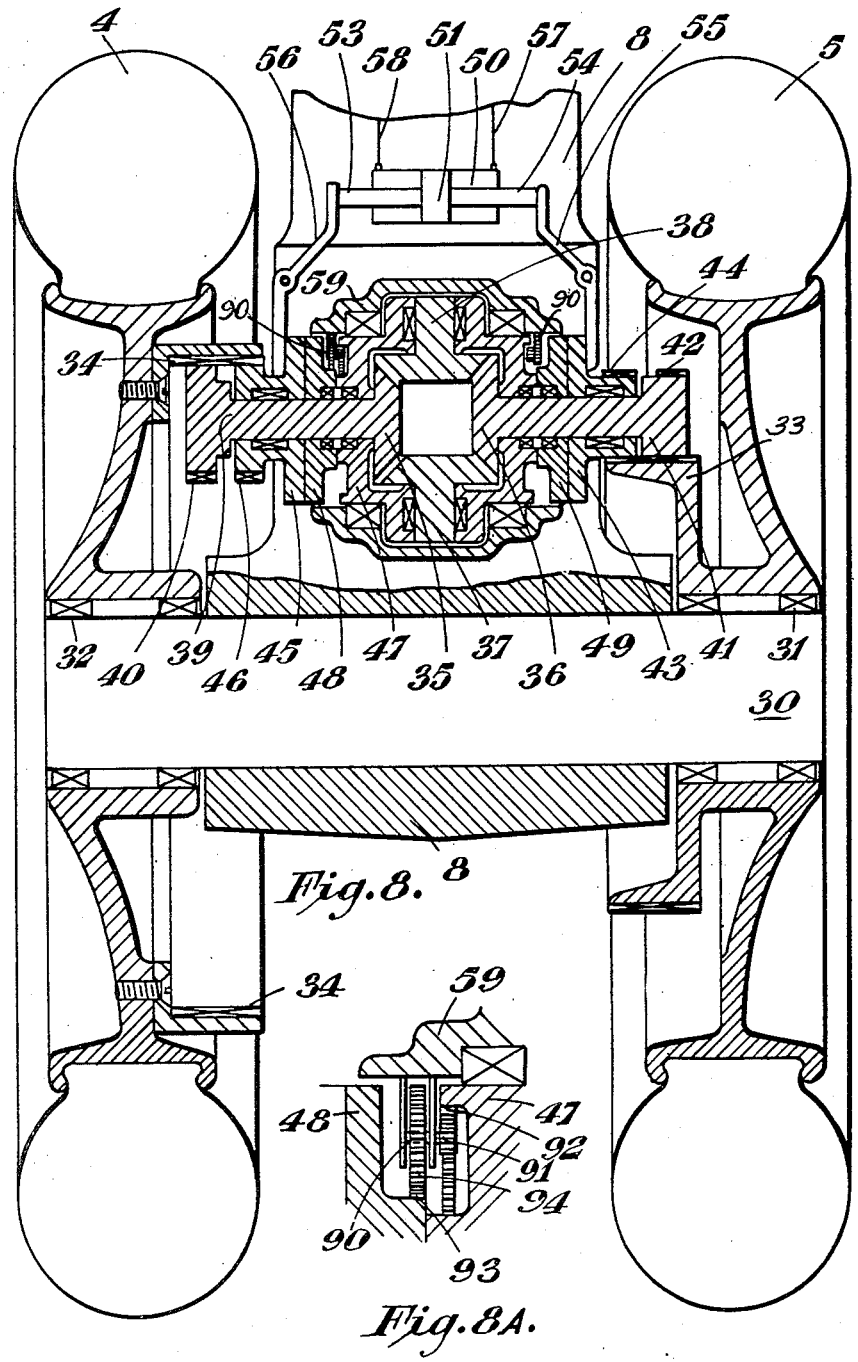

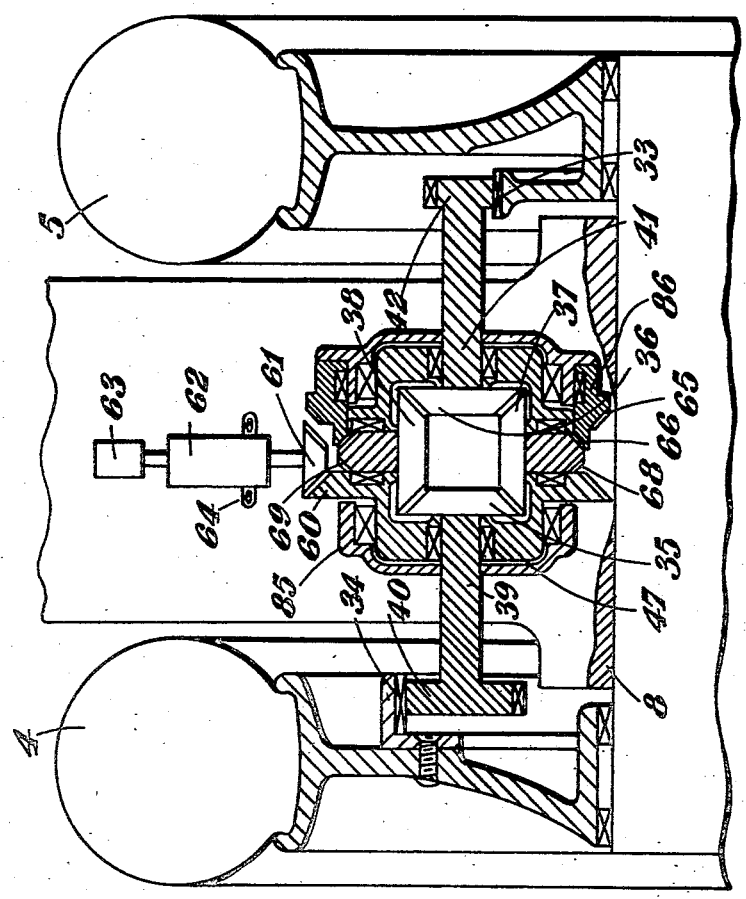

Patented Aug. 31, 1954

2,687,857

UNITED STATES PATENT OFFICE 2,687,857

STEERING MEANS FOR AIRCRAFT LANDING GEAR

Harry Balshaw Caldwell, Penketh, Warrington, and Kenneth George Hancock, Sankey, Warrington, England, assignors to Electro-Hydraulics Limited, Warrington, England, a company of Great Britain Application June 12, 1950, Serial No. 167,505

12 Claims. (Cl. 244—50)

This invention relates to the steering of aircraft upon the ground and concerns more particularly the steering of aircraft through its lending gear by means of a servo-steering system.

According to the present invention the steering of aircraft is effected by a servo-steering system comprising a steerable castor unit, including two wheels spaced one on either side of the pivot axis of the castor, the servo-steering action being obtained by disturbing the balance of natural rotation of said wheels, whereby forward motion of the aircraft is utilised to swivel said unit into a new position of balance, dependent upon the extent of the disturbance.

The said disturbance of natural rotation of the wheels may be effected in various ways and can be broadly stated as follows:

(1) By causing the wheels differentially, and (2) In the case of wheels constrained to rotate together, by, in effect altering their diameters.

In the first case preferably a pair of wheels are provided in combination with mechanism for causing a differential speed of one of the wheels in relation to the other, and this speed variation may be an acceleration or deceleration. In the case of aircraft castoring nose or tail wheels or main undercarriage leg, each wheel is rotated independently or both wheels are mounted on a rotating axle in which case friction means are provided to allow one wheel to rotate relative to the axle.

It is to be appreciated that when one wheel is braked to cause the differential speed rotation the energy released by its deceleration may be utilised to accelerate the other wheel.

The acceleration of one wheel relatively to the other can also be obtained by the provision of a suitable motor, for example an electric or fluid-pressure operated motor, which is arranged so as to rotate the wheels differentially. If means are provided to prerotate the wheels before landing, the said means could also be made to provide the differential acceleration. It will be appreciated that when the motor is put into operation it will tend to turn the wheel which is accelerated round the other wheel which thus appears to be retarded against the first, so that again the aircraft is steered.

In the second case, again a pair of castor wheels are preferably provided, which may form part of the main undercarriage leg of the aircraft or a nose or tail wheel arrangement and in this case the wheels are mounted on a common axle which prevents relative rotation of the wheels, the disturbance of the balance of natural rotation being obtained through means which is adapted to tilt the said axle.

As an alternative to this last arrangement in which the wheels are constrained to move together, the wheels may be carried from a steerable support in such a manner as to have a castor action, said support being "raked" forwardly and downwardly whereby, upon steering, that wheel which is on the inside, is, in effect, reduced in diameter, whilst that on the outside is in effect expanded in diameter.

Various forms of servo-steering systems according to the present invention are diagrammatically illustrated in the accompanying drawings, the systems being applied to the nose wheel of an aircraft.

Figures 1, 2, 3, 3a, 4, and 4b show a construction in which the wheels are constrained to move together, Figure 1 being in end elevation, Figures 2 and 3 in side elevation and Figures 4, and 4b being similar views respectively but showing the parts operated to steer in a direction opposite from that in Figures 1, 2 and 3.

Figures 5 and 5a show in end and side elevation another form in which the wheels are constrained to move together and wherein the wheels are mounted on a common axle which can rotate but cannot be tilted in relation to the undercarriage leg structure, Figure 6 showing the effect on the wheels when disturbance of the rotation of the wheels is effected, Figure 6a being a plan view of this construction, Figure 6 being shown as viewing Figure 6a from the left. Figure 7 illustrates the turning circle of the wheels illustrated in Figures 5, 5a, 6 and 6a.

Figure 8 shows in vertical section a modified form of the arrangement shown in Figure 1 and in which the deceleration of one wheel is utilised to accelerate the other, Figure 8a being a detail view on an enlarged scale whilst Figures 9 and 10 are vertical sections of further modified forms.

Figure 11 shows schematically the positioning of a caster wheel construction embodying the invention as the nose wheel of an aircraft landing gear.

Figure 9:
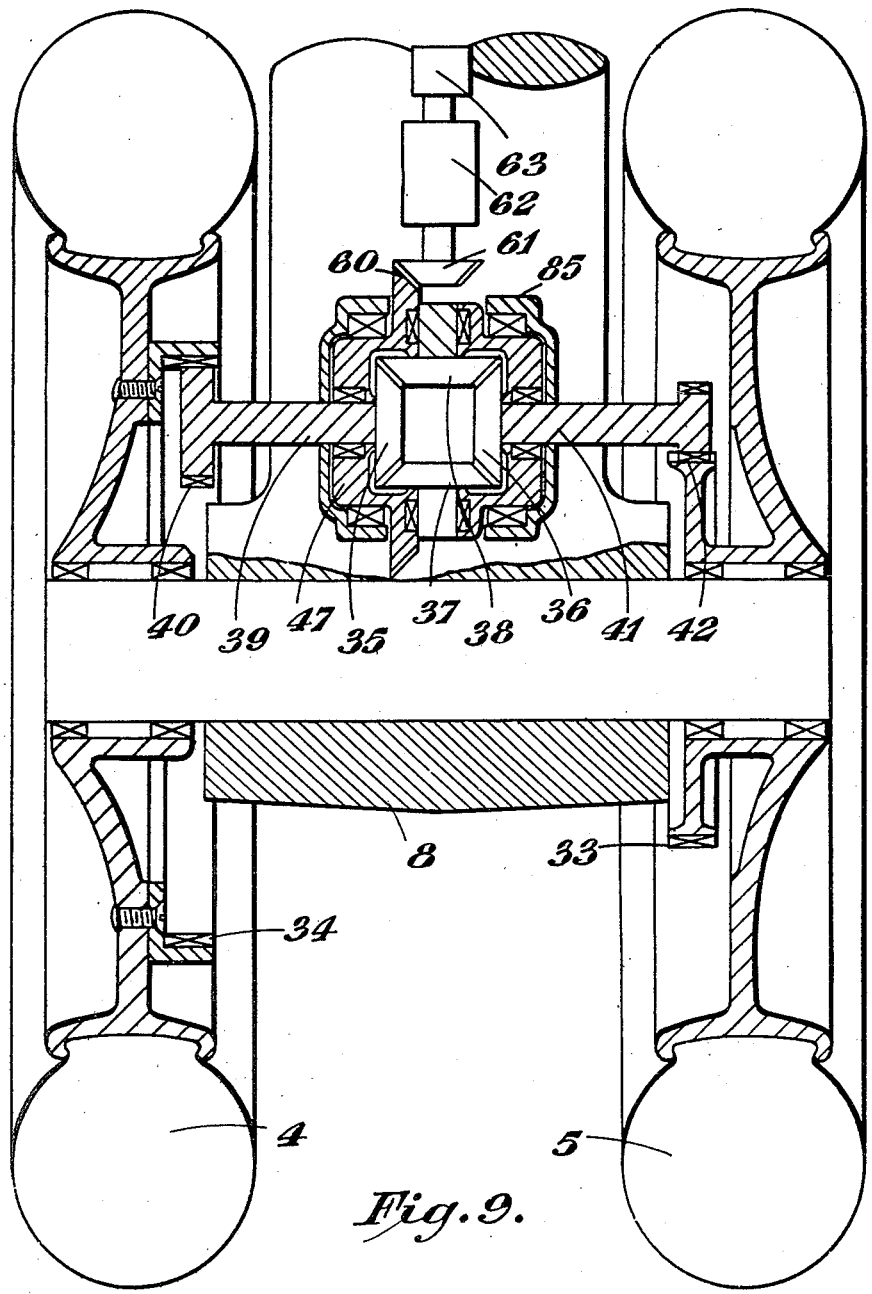

Referring to the construction shown in Figures 1, 2, 3a, 4 and 4b the aircraft nose wheel comprises a resilient telescopic strut 1 adapted to be hinged to the aircraft. A pair of wheels 4, 5 are each rotatably mounted on an axle 21 carried by an axle bracket 8, the wheels being arranged one on either side of the fore and aft axis of the aircraft, so that the wheels are spaced apart along the axis of rotation of the wheels.

The nose wheels are in knonw manner arranged as castoring wheels. In one such known form the axle bracket 8 is fast with a tube 10 which forms part of the shock absorbing unit, which is rotatably mounted in the upper part of a castoring cylinder 11 connected by toggles 12, 13 to the axle bracket 8.

One such arrangement in which the disturbance of the natural balance of rotation is attained by tilting for example the nose wheel axle, is illustrated in said Figures 1, 2, 3, 3a, 4 and 4b. Referring to these figures there is provided a pair of said wheels 4, 5 which are mounted on a common axle namely said axle 21, in such a way that both wheels can rotate freely together, but neither one can rotate with respect to the other. Said axle 21 and the wheels 4 and 5 are arranged to swing bodily about a horizontal axis, the centre line of which is at right angles to the wheel axle. It will be appreciated by this arrangement the wheels can be made to roll along a straight or curved path by causing the axle to pivot. The axle 21 is pivotally connected to the axle bracket 8 of the aircraft leg 1 which carries or has integral therewith a lug 22 to which is hinged the cylinder of a double-acting jack 23, the piston rod 24 of which is hinged on the axle 21, on one side of the castor axis of the unit formed by the castoring wheels.

When it is desired to steer the aircraft on a straight path, the piston of the jack 23 is kept in a medial position so that the wheel axle 21 is approximately at right angles to the leg 1. If it be desired to steer the aircraft, for example to the right as shown in Figures 3a, 4, and 4b, the jack 23 is closed, the closing of the jack causing the axle 21 to tilt so that the castoring wheel 5 is depressed thus shortening its rolling radius and therefore decreasing its peripheral velocity and so disturbing the balance of natural rotation of the wheels, and steering the aircraft to the right. It will, of course, be appreciated that if the jack is extended, the other wheel will be depressed so that the aircraft will be steered to the left, as shown in Figures 1, 2 and 3.

The jack may be an hydraulically operated or other fluid pressure operated jack or any other means can be employed to cause the tilting of the axle.

Referring to Figures 5, 5a, 6, 6a and 7 this construction includes two castor wheels 4, 5 again fixed on a common axle 21 so that they can both rotate freely with the axle 21, but neither can rotate with respect to the other, the common axle being rotatably mounted but otherwise fixed to the landing gear leg 1. The leg itself is mounted from the undercarriage with a forward "rake" repersented by angle α°, Figure 5a, the wheels being mounted in a trailing position, preferably in a rearward sense in relation to the leg.

When it is desired to steer the aircraft, for example, to the left, the leg, axle bracket 8 and axle 21 are turned or swing bodily to the left by any known means which may, for example, be a pressure operated system. Due to the forward "rake" of the leg, the turning movement of the axle of the castoring wheels depresses the left wheel 5 and allows the other wheel 4 figuratively to expand, thus altering the rolling radii of the wheels to disturb the balance of natural rotation thereof. This depression and expansion will be a function of the rotation about the castor axis and the centre of the turning circle will be a point 25 (Figure 7) where the prolongation of the common wheel axis meets the plane through the areas of wheel contact with the ground.

Referring to Figures 8 and 8a the arrangement is such that on braking of one wheel, the energy released by its deceleration is, instead of being dissipated in heat, utilised to accelerate the other wheel.

The axle bracket 8 carries the wheel axle 30, on whose bearings 31 and 32, the wheels 4 and 5 are allowed to rotate independently. The wheel 5 is provided with external gear 33 and the wheel 4 is provided with internal gear 34. In or on the axle bracket 8 there is fixed a box 59 containing a differential gear set comprising gears 35, 36, 37 and 38. Gear 35 is connected by a half axle 39 to gear 40 in mesh with the internal gear 34 of the wheel 4 and the gear 36 is connected by a half axle 41 to the gear 42 in mesh with the external gear 33 of the wheel 5. Surrounding the half axle 41 is a clutch 43 carrying a gear 44 also in mesh with the gear 33 of the wheel 5, and surrounding the half axle 39 is a clutch 45 carrying a gear 46 in mesh with the gear 34 of the wheel 4. Between the clutches 43 and 45 and the half axles 39 and 41 there are interposed bearings to allow for independent rotation. Also rotatably mounted on the half axles 39 and 41 respectively are the back plates 48 and 49 capable of co-operating with the clutches 43 and 45, but held normally apart by biassing means, for example, springs (not shown). As will be seen from Figure 8a, the back plates 48 and 49 are provided with external gears 93, capable of co-operating with a gear 94. (Figure 8a illustrates the back plate 48; the parts on back plate 49 are identical.)

The gears of the planet 91 are in mesh with gears 92 of the cage 47. The planet gears 91 and 94 are constrained to move together and on the pin 90 carried by brackets fixed to the casing 59. There is provided a fluid pressure operated motor 50, whose piston 51 carries piston rods 53 and 54, on either side, capable of operating the clutches 43, 45 through levers 55 and 56 when fluid pressure is admitted to the motor by pipe lines 57 and 58. Known follow-up systems may be provided for the pilot to control the application of fluid pressure, but these systems are not shown.

This system works as follows:

When the wheels 4 and 5 are moving on a straight path and therefore in a natural, identical, and balanced velocity, the wheels will rotate gears 36 and 35 in opposite directions but at an identical speed, so that gears 37 and 38 are each rotated round its axis, but the cage 47 remains stationary. Clutches 43 and 45 will also be rotated by the gears of the wheels 4 and 5, but due to the biassing means, will be inoperative.

If it is desired to steer the wheel to one or the other side, the pilot will supply fluid pressure to the motor 50. If he supplies fluid pressure to line 57 and connects 58 to exhaust, piston 51 will be moved to the left, carrying the piston rod 53 with it, acting on the lever 56 and tilting it round its pivot point so as to bring clutch 45 in connection with the back plate 48. Gears 93 of the back plate 48 will rotate planet gears 94 and 91 in the opposite direction to the movement of clutch 45. This rotation of the planet gears will be transmitted by the internal gears 92 of the cage 47 to the cage, and the cage will now be rotated in the opposite direction from the clutch 45, but at a reduced speed, due to the reduction by the two planet gears. The rotation of the cage 47 will be transmitted by the pinions 37 and 38 onto the half axle 41 in the reverse direction, and the half axle 41 with its gears 42 will be accelerated, and this acceleration will be transmitted through the gears 33 onto the wheel 5. The deceleration of wheel 4 will be proportional to the acceleration of wheel 5 and the latter will be rotated round the wheel 4 in the castoring sense. When both wheels have obtained the required angular position for steering, the supply of fluid pressure will be stopped, which may be done either manually or by known follow-up system.

When it is desired to steer the wheels 4 and 5 in the opposite direction, fluid pressure will be admitted by pipe line 58 and exhausted by pipe line 57, and lever 55 will actuate clutch 43 so that wheel 5 is decelerated and wheel 4 accelerated proportionally thus turning wheel 4 round wheel 5 in the castoring sense.

Reference has been made above to the fact that a motor can be provided for accelerating one wheel in relation to the other for steering purposes. An example of such an arrangement is shown in Figures 9 and 10. The arrangement shown in Figure 9 differs from that shown in Figure 8 only in that the clutches 43, 45 and the motor 50 are omitted. In this arrangement, therefore, the cage 47 is provided with an outer gear 60 capable of being operated by a gear 61 which can be rotated by a reversible motor 63, e. g. an electric or fluid motor acting through a reduction gear 62.

When it is desired to steer the wheels 4 and 5 in one direction, motor 63 will be actuated to rotate gear 61 in the direction from the right to the left; this will rotate the cage 47 through its gear 60 and thus accelerate wheel 5. Wheel 5 will therefore turn around wheel 4 in the castoring sense. If the motor 63 is actuated in the opposite direction, gear 61 will rotate from left to right and wheel 4 will be turned round the wheel 5 in the castoring sense.

The differential gear which provides the means for steering can also be used for the prerotation of both wheels before landing and in Figure 10 there is illustrated an arrangement of this type.

This arrangement is the same as that shown in Figure 9 but in addition the pinion 38 is provided at its outer end with a gear 69 and the pinion 37 is provided at its outer end with a gear 68. In mesh with the gears 68 and 69 is the internal gear 66 of a rotating ring 86 which is also provided with an external gear 65. Reduction gear 62 is arranged to slide in brackets 64 so that gear 61 may either be in mesh with gear 60 or gear 65. When gears 60 and 61 are in mesh, the reduction gear 62 will provide for a small number of revolutions per minute; when gears 61 and 65 are in mesh, the reduction gear 62 will, within itself, automatically provide for a large number of revolutions and will at the same time bring means such as a clutch (not shown) into operation for preventing the gear 60 from rotating. The change of reduction within the gear 62 and this clutch are not shown but the working of such means is well known.

The system works as follows:

When it is desired to steer the wheels on the ground, the system will work similar to the system in Figure 9 and the ring 86 will rotate with the pinions 37 and 38.

When it is desired to prerotate both wheels, gear 61 will be brought into mesh with gear 65 by moving reduction gear 62 and the gear 61 bodily to the right in the slots of the brackets 64. At the same time, the clutch referred to above will engage gear wheel 60 to prevent its rotation and the motor drive will be transmitted through the gearing 62 to rotate gear 61 at a high speed due to the automatic change of the reduction in gear 62. Gears 61 will now drive wheel 66 and through the latter, both pinions 37 and 38, and therefore the half axles 39 and 41, in opposite directions, but at identical revolutions per minute. The half axles 39 and 41 will transfer their rotation onto the wheels 4 and 5 and the latter will therefore be prerotated at an identical speed in the same direction.

Figure 11 shows schematically the positioning of a caster wheel construction embodying the invention as the nose wheel of an aircraft generally designated A. The caster wheel construction generally denoted C is in advance of two trailing wheels, one of which is shown at T. The caster wheel construction may be of the kind represented by any of the forms illustrated in Figures 1 to 10 inclusive and described above.

We claim:

1. A servo-steering system for the steering of aircraft upon the ground through its landing gear, said system comprising a steerable castor unit, including two castoring nose wheels spaced one on either side of the pivot axis of the castor, means mounting said wheels to rotate about a common axis and enabling said wheels to rotate together and also relatively to one another at different speeds, and means for disturbing the natural balance of rotation of said wheels comprising a differential gear mechanism carried by said unit and being intergeared with said wheels respectively, and means comprising a motor for operating said differential gear mechanism to cause said wheels to be driven at different speeds and forward motion of the aircraft to effect swivelling of said unit into a new position of balance.

2. A servo-steering system as claimed in claim 1 including a clutch device for coupling one of said wheels to an element of said differential gear mechanism.

3. A servo-steering system as claimed in claim 1 including means connecting the motor to the differential gear mechanism for accelerating one wheel in relation to the other.

4. A servo-steering system as claimed in claim 1 in which the aircraft is steered through a pair of castoring nose wheels having a resilient telescopic unit including a shock absorber unit, each wheel being rotatably mounted on a stub axle carried by an axle bracket fast with the shock absorber unit, and in which said differential gear mechanism is operable for utilizing the energy released by the deceleration of one wheel to accelerate the other wheel.

5. A servo-steering system as claimed in claim 1 in which the aircraft is steered through a pair of castoring nose wheels having a resilient telescopic unit including a shock absorber unit, each wheel being rotatably mounted on a stub axle carried by an axle bracket fast with the shock absorber unit, and which includes a clutch device cooperable with said differential gear mechanism for effecting operation thereof to utilize the energy released by the deceleration of one wheel to accelerate the other wheel.

6. A servo-steering system for the steering of aircraft upon the ground through its landing gear, said system comprising a steerable castor unit including a leg and two castoring nose wheels spaced one on either side of the leg, axle means on and perpendicular to the leg on which said wheels are journalled, and means carried by the unit for disturbing the natural balance of rotation of the wheels comprising differential gear mechanism intergeared with each wheel, and means including a motor cooperable with said differential gear mechanism for causing said wheels to be driven at relatively different speeds when the aircraft has forward motion.

7. A servo-steering system for the steering of aircraft upon the ground through its landing gear, said system comprising a steerable castor unit including a leg and two castoring nose wheels spaced one on either side of the leg, axle means on and perpendicular to the leg on which said wheels are journalled, and means carried by the unit for disturbing the natural balance of rotation of the wheels comprising differential gear mechanism generally parallel to and relatively close to said axle means intergeared with each wheel, and means including a motor cooperable with said differential gear mechanism for causing said wheels to be driven at relatively different speeds when the aircraft has forward motion.

8. A servo-steering system for the steering of aircraft upon the ground through its landing gear, said system comprising a steerable castor unit including a leg and two castoring nose wheels spaced one on either side of the leg, axle means on and perpendicular to the leg on which said wheels are journalled, and means carried by the unit for disturbing the natural balance of rotation of the wheels comprising differential gear mechanism, one of said wheels having an external gear intergeared with said differential gear mechanism and the other of said wheels having an internal gear intergeared with said differential gear mechanism, and means including a motor cooperable with said differential gear mechanism for causing said wheels to be driven at relatively different speeds when the aircraft has forward motion.

9. A servo-steering system for the steering of aircraft upon the ground through its landing gear, said system comprising a steerable castor unit including a leg and two castoring nose wheels spaced one on either side of the leg, axle means on and perpendicular to the leg on which said wheels are journalled, and means carried by the unit for disturbing the natural balance of rotation of the wheels comprising differential gear mechanism intergeared with each wheel, a motor, a reduction gear including a shaft carried by the unit and driven by the motor and disposed generally perpendicularly of said axle means and intergeared with said differential gear mechanism for causing said wheels to be driven at relatively different speeds when the aircraft has forward motion.

10. A servo-steering system for the steering of aircraft upon the ground through its landing gear, said system comprising a steerable castor unit including a leg and two castoring nose wheels spaced one on either side of the leg, axle means on and perpendicular to the leg on which said wheels are journalled, and means carried by the unit for disturbing the natural balance of rotation of the wheels comprising differential gear mechanism intergeared with each wheel and including two driving gears respectively rotatable at different speeds to enable free rotation of both wheels, a motor, a shaft driven by said motor, a gear member carried by said shaft selectively engageable with said driving-gears, and means mounting said shaft and said gear member to shift for effecting selective engagement of said gear member with said driving gears to thereby drive the selected driving gear and cause said wheels to be driven at relatively different speeds when the aircraft has forward motion.

11. A servo-steering system for the steering of aircraft upon the ground through its landing gear, said system comprising a steerable castor unit including a leg and two castoring nose wheels spaced one on either side of the leg, axle means on and perpendicular to the leg on which said wheels are journalled, and means carried by the unit for disturbing the natural balance of rotation of the wheels comprising differential gear mechanism intergeared with each wheel and including two normally disengaged clutch devices cooperable respectively with said wheels, a motor, and means operable by said motor for effecting engagement of a selected one of said clutch devices for causing said wheels to be driven at relatively different speeds when the aircraft has forward motion.

12. A servo-steering system for the steering of aircraft upon the ground through its landing gear, said system comprising a steerable castor unit including a leg and two castoring nose wheels spaced one on either side of the leg, axle means on and perpendicular to the leg on which said wheels are journalled, and means carried by the unit for disturbing the natural balance of rotation of the wheels comprising differential gear mechanism intergeared with each wheel and including two normally disengaged clutches cooperable respectively with said wheels, a motor having a part movable close to and parallel to said axle means, and means connecting said motor movable part to said clutches for effecting engagement of a selected one of said clutches and thereby causing said wheels to be driven at relatively different speeds when the aircraft has forward motion.

References Cited in the file of this patent

UNITED STATES PATENTS

| Number | Name | Date |
| --- | --- | --- |
| 492,637 | Stratton | Feb. 28, 1893 |
| 1,107,791 | Houghton | Aug. 18, 1914 |
| 1,119,284 | Holtermann | Dec. 1, 1914 |
| 1,682,386 | Lewis | Aug. 28, 1928 |
| 1,957,675 | Semmes | May 8, 1934 |
| 2,401,364 | Mercier | June 4, 1946 |
| 2,401,796 | Raitch | June 11, 1946 |
| 2,460,387 | Hunter | Feb. 1, 1949 |
| 2,503,755 | Martin | Apr. 11, 1950 |
| 2,540,991 | Price | Feb. 6, 1951 |